US012772181B2

(12) United States Patent
Xu

(10) Patent No.: US 12,772,181 B2
(45) **Date of Patent: *Oct. 20, 2026**

(54) WIRELESS COMMUNICATION METHOD, NETWORK DEVICE AND TERMINAL DEVICE

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,502

(22) Filed: Jul. 5, 2023

(65) Prior Publication Data

US 2023/0362842 A1 Nov. 9, 2023

Related U.S. Application Data

(63) Continuation of application No. 17/128,813, filed on Dec. 21, 2020, now Pat. No. 11,758,489, which is a continuation of application No. PCT/CN2018/092669, filed on Jun. 25, 2018.

(51) Int. Cl.
*H04W 56/00* (2009.01)
*H04W 52/02* (2009.01)

(52) U.S. Cl.
CPC ....... *H04W 56/00* (2013.01); *H04W 52/0225* (2013.01)

(58) Field of Classification Search
CPC ............ H04W 48/14; H04W 52/0216; H04W 52/0225; H04W 52/0229; H04W 52/0235; H04W 56/00; H04W 56/0015; H04W 68/00; H04W 76/27; H04W 76/40; H04L 5/0048; H04L 5/0094; Y02D 30/70
See application file for complete search history.

(56) References Cited

U.S. PATENT DOCUMENTS

| | | | |
|---|---|---|---|
| 8,249,004 | B2 | 8/2012 | Wang |
| 9,264,997 | B2 | 2/2016 | Gaal et al. |
| 9,544,794 | B2 | 1/2017 | Kim et al. |

(Continued)

FOREIGN PATENT DOCUMENTS

| | | | |
|---|---|---|---|
| CN | 107624255 | A | 1/2018 |
| CN | 107925542 | A | 4/2018 |

(Continued)

OTHER PUBLICATIONS

The international search report of PCT application No. PCT/CN2018/092669, dated Mar. 26, 2019.

(Continued)

*Primary Examiner* — Liton Miah
(74) *Attorney, Agent, or Firm* — Ladas & Parry LLP

(57) ABSTRACT

Embodiments of the present disclosure provide a wireless communication method and a device, which are beneficial to energy saving of a terminal. The method includes: sending, by a network device, an energy-saving signal to a terminal device, where the energy-saving signal is configured to indicate first configuration information of a signal used for synchronization.

18 Claims, 6 Drawing Sheets

(56) References Cited

U.S. PATENT DOCUMENTS

| | | | | |
|---|---|---|---|---|
| 10,581,569 | B2 | 3/2020 | Damnjanovic et al. | |
| 10,904,845 | B2 | 1/2021 | Bhattad et al. | |
| 12,213,142 | B2 * | 1/2025 | Wang | H04J 13/0022 |
| 2014/0010131 | A1 | 1/2014 | Gaal et al. | |
| 2014/0050135 | A1 | 2/2014 | Zhang et al. | |
| 2015/0009898 | A1 | 1/2015 | Rosa | |
| 2017/0257842 | A1 * | 9/2017 | Hessler | H04W 56/00 |
| 2019/0230590 | A1 * | 7/2019 | Wu | H04W 52/0274 |
| 2019/0239189 | A1 * | 8/2019 | Hwang | H04W 52/0216 |
| 2020/0022082 | A1 * | 1/2020 | Ljung | H04W 52/0229 |
| 2020/0267670 | A1 * | 8/2020 | Åström | H04W 52/0216 |

FOREIGN PATENT DOCUMENTS

| | | | |
|---|---|---|---|
| CN | 108134659 | A | 6/2018 |
| JP | 201056740 | A | 3/2010 |
| JP | 2015526027 | A | 9/2015 |
| JP | 5992618 | B2 | 9/2016 |
| JP | 2020519196 | A | 6/2020 |
| KR | 20100084672 | A | 7/2010 |
| KR | 20150074148 | A1 | 7/2015 |
| WO | 2018082528 | A1 | 5/2018 |
| WO | 2018108265 | A1 | 6/2018 |
| WO | 2018204799 | A1 | 11/2018 |

OTHER PUBLICATIONS

MediaTek Inc.; "Summary of TRS remaining details"; 3GPP TSG-RAN WG1 Meeting #91 R1-1721419; Reno, United States, Dec. 1, 2017(Nov. 27, 2017-Dec. 1, 2017), 10 pages.

The EESR of corresponding European application No. 18924443.7, dated May 27, 2021.

Intel Corporation: "WUS consideration for efeMTC", 3GPP Draft; R2-1710641 WUS, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Oct. 8, 2017(Oct. 8, 2017), XP051342675.

The first Office Action of corresponding Indian application No. 202117003031, dated Jan. 13, 2022.

The first Office Action of corresponding Korean application No. 10-2021-7002169, dated Feb. 9, 2022.

The first Office Action of corresponding Japanese application No. 2020-570817, dated Feb. 15, 2022.

The Decision of Rejection of corresponding Japanese application No. 2020-570817, dated May 10, 2022.

The Notice of Allowance of corresponding Korean application No. 10-2021-7002169, dated Aug. 5, 2022.

The first Office Action of corresponding European application No. 18924443.7, dated May 17, 2023.

The first Office Action of corresponding Korean application No. 10-2022-7038868, dated Jun. 5, 2023.

The first Office Action of corresponding Australian application No. 2018430510, dated Feb. 13, 2024.

The Notice of Allowance of corresponding Korean application No. 10-2022-7038868, dated Jun. 28, 2024.

The second Office Action of corresponding European application No. 18924443.7, dated Mar. 20, 2025.

The Hearing notice of corresponding Indian application No. 202117003031, dated Jan. 23, 2025.

The extended Hearing notice of corresponding Indian application No. 202117003031, dated Feb. 5, 2025.

The third Office Action of corresponding European application No. 18924443.7, dated Aug. 3, 2026.

* cited by examiner

WIRELESS COMMUNICATION METHOD, NETWORK DEVICE AND TERMINAL DEVICE

CROSS-REFERENCE TO RELATED APPLICATIONS

This application is a continuation of U.S. patent application Ser. No. 17/128,813, filed on Dec. 21, 2020, which is a continuation of International Application No. PCT/CN20181092669, filed on Jun. 25, 2018, entitled “WIRELESS COMMUNICATION METHOD, NETWORK DEVICE AND TERMINAL DEVICE”, both of which are hereby incorporated by reference in their entireties.

TECHNICAL FIELD

Embodiments of the present disclosure relate to the field of communication technologies and, in particular, to a wireless communication method, a network device and a terminal device.

BACKGROUND

In a wireless communication system, before receiving a signal such as system information or a paging message, a terminal device needs to perform synchronization.

For example, the terminal device can realize coarse time-frequency synchronization and fine time-frequency synchronization depending on a Primary Synchronous signal (PSS), a Secondary Synchronous signal (SSS) (and a Physical Broadcast Channel (PBCH) Demodulation Reference Signal (DMRS)) in a periodically transmitted Synchronous signal (SS)/physical broadcast channel (PBCH), and the terminal device generally needs to receive several SS/PBCH blocks to meet a requirement for fine time-frequency synchronization.

However, since the period of the SS/PBCH is at least 5 ms, with a typical value of 10 ms or 20 ms, the terminal device needs to receive the SS/PBCH tens or even hundreds of ms in advance before receiving the system information or paging message for a synchronization operation, which is obviously unbeneficial to energy-saving of the terminal device.

SUMMARY

Embodiments of the present disclosure provide a wireless communication method and a device, which are beneficial to energy-saving of a terminal.

In a first aspect, there is provided a wireless communication method, including:

- sending, by a network device, an energy-saving signal to a terminal device, where the energy-saving signal is configured to indicate first configuration information of a signal used for synchronization.

In a second aspect, there is provided a wireless communication method, including:

- sending, by a network device, indication information to a terminal device, where the indication information is configured to indicate a plurality of symbol sets occupied by a signal used for synchronization in a single slot.

In a third aspect, there is provided a wireless communication method, including:

- sending, by a network device, a broadcast message to a terminal device, where the broadcast message is configured to indicate configuration information of a tracking reference signal TRS or an enhanced tracking reference signal eTRS.

In a fourth aspect, there is provided a wireless communication method, including:

- sending, by a network device, a signal used for synchronization to a terminal device; where the signal used for synchronization occupies a plurality of symbol sets in a single slot.

In a fifth aspect, there is provided a wireless communication method, including:

- receiving, by a terminal device, an energy-saving signal sent by a network device, where the energy-saving signal is configured to indicate first configuration information of a signal used for synchronization; and
- receiving, by the terminal device, the signal used for synchronization based on the first configuration information.

In a sixth aspect, there is provided a wireless communication method, including:

- receiving, by a terminal device, indication information sent by a network device, where the indication information is configured to indicate a plurality of symbol sets occupied by a signal used for synchronization in a single slot; and
- receiving the signal used for synchronization based on the indication information.

In a seventh aspect, there is provided a wireless communication method, including:

- receiving, by a terminal device, a broadcast message sent by a network device, where the broadcast message is configured to indicate configuration information of a tracking reference signal TRS or an enhanced tracking reference signal eTRS; and
- receiving, by the terminal device, the TRS or the eTRS based on the configuration information.

In an eighth aspect, there is provided a wireless communication method, including:

- receiving, by a terminal device, a signal used for synchronization sent by a network device, where the signal used for synchronization occupies a plurality of symbol sets in a single slot; and
- performing, by the terminal device, time-frequency synchronization based on the received signal used for synchronization.

In a ninth aspect, there is provided a network device for performing the method according to the first aspect, the second aspect, the third aspect or the fourth aspect.

Specifically, the network device includes a functional module for performing the method according to the first aspect, the second aspect, the third aspect or the fourth aspect.

In a tenth aspect, there is provided a terminal device for performing the method in the fifth aspect, the sixth aspect, the seventh aspect, or the eighth aspect.

Specifically, the terminal device includes a functional module for performing the method in the fifth aspect, the sixth aspect, the seventh aspect, or the eighth aspect.

In an eleventh aspect, there is provided a network device including a processor and a memory. The memory is used to store a computer program, and the processor is used to call and run the computer program stored in the memory to perform the method according to the first aspect, the second aspect, the third aspect, or the fourth aspect.

In a twelfth aspect, there is provided a terminal device including a processor and a memory. The memory is used to store a computer program, and the processor is used to call and run the computer program stored in the memory to perform the method in the fifth aspect, the sixth aspect, the seventh aspect, or the eighth aspect.

In a thirteenth aspect, there is provided a chip for implementing the method in any one of the first aspect to the eighth aspect.

Specifically, the chip includes a processor for calling and running a computer program from a memory, so that the device installed with the chip executes the method in any one of the first aspect to the eighth aspect.

In a fourteenth aspect, there is provided a computer-readable storage medium for storing a computer program that causes a computer to execute the method in any one of the first aspect to the eighth aspect.

In a fifteenth aspect, there is provided a computer program product including a computer program instruction that cause a computer to perform the method in any one of the first aspect to the eighth aspect.

In a sixteenth aspect, there is provided a computer program that, when run on a computer, causes the computer to perform the method in any one of the first aspect to the eighth aspect or the method in various implementation manners according to the first aspect to the eighth aspect.

Upon above technical solutions, a network device sends an energy-saving signal indicating first configuration information of a signal used for synchronization to a terminal device, then the terminal device may obtain configuration information based on the energy-saving signal, so as to perform receiving of the signal used for synchronization, which may improve the synchronization efficiency and reduce power consumption of the terminal. Furthermore, the manner for indicating the configuration information of the signal used for synchronization based on the energy-saving signal can realize more dynamic configuration of the signal used for synchronization.

DESCRIPTION OF EMBODIMENTS

The technical solution in embodiments of the present disclosure will be described below with reference to the accompanying drawings. Apparently, the described embodiments are merely a part rather than all embodiments of the present disclosure. All other embodiments obtained by persons of ordinary skill in the art based on embodiments in the present disclosure without paying creative labor shall fall within the protection scope of the present disclosure.

The technical solutions of embodiments of the present disclosure can be applied to various communication systems, such as a global system of mobile communication (GSM) system, a code division multiple access (CDMA) system, a wideband code division multiple access (WCDMA) system, general packet radio service (GPRS), a long term evolution (LTE) system, an LTE frequency division duplex (FDD) system, an LTE Time Division Duplex (TDD) system, a universal mobile telecommunication system (UMTS), a worldwide interoperability for microwave access (WiMAX) communication system, a 5G system, and the like.

Figure 1:
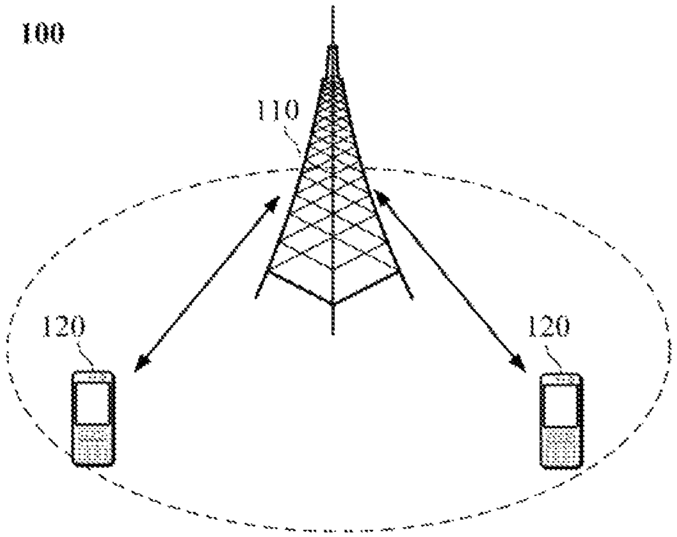
FIG. 1 is a schematic diagram of a communication system architecture provided by an embodiment of the present disclosure.

Exemplarily, a communication system 100 applied in the embodiment of the present disclosure is shown in FIG. 1. The communication system 100 may include a network device 110, which may be a device that communicates with a terminal device 120 (or referred to as a communication terminal, a terminal). The network device 110 can provide communication coverage for a specific geographical area, and can communicate with the terminal device located in the coverage area. Optionally, the network device 110 may be a Base Transceiver Station (BTS) in a GSM system or a CDMA system, a base station (NodeB, NB) in a WCDMA system, or an Evolutional Node B (eNB or eNodeB) in an LTE system, or a wireless controller in a Cloud Radio Access Network (CRAN), or the network device can be a mobile switching center, relay station, access point, vehicle-mounted device, wearable device, hub, switch, bridge, router, network side device in a 5G network or network device in a future evolved Public Land Mobile Network (PLMN), etc.

The communication system 100 also includes at least one terminal device 120 located within the coverage area of the network device 110. As a "terminal device" used herein includes, but is not limited to, a device which is connected via wired lines, such as connected via a public switched telephone networks (PSTN), a digital subscriber line (DSL), a digital cable, and a direct cable; and/or a device which is connected via another data connection/a network; and/or a device which is connected via a wireless interface, such as a cellular network, a Wireless Local Area Network (WLAN), a digital television network such as a DVB-H network, a satellite network, an AM-FM broadcast transmitter; and/or a device which is connected via another terminal device arranged to receive/transmit communication signals; and/or an Internet of Things (IoT) device. A terminal device set to communicate through a wireless interface may be referred to as a "wireless communication terminal", a "wireless terminal" or a "mobile terminal". Examples of mobile terminals include, but are not limited to, satellite or cellular phones; Personal Communications System (PCS) terminals that can combine cellular radiotelephones with data processing, facsimile, and data communication capabilities; Personal Digital Assistants (PDAs) that can include radiotelephones, pagers, internet/intranet access, Web browsers, notebooks, calendars, and/or Global Positioning System (GPS) receivers; as well as conventional laptops and/or palmtop receivers or other electronic devices including radio telephone transceivers. The terminal device may refer to an access terminal, a user equipment (UE), a subscriber unit, a subscriber station, a mobile station, a mobile unit, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a PDA, a handheld device with wireless communication function, a computing device or other processing device connected to wireless modem, a vehicle-mounted device, a wearable device, a terminal device in 5G network or a terminal device in future evolved PLMN, etc.

Optionally, Device to Device (D2D) communication may be performed between the terminal devices 120.

Optionally, the 5G system or 5G network may also be referred to as a New Radio (NR) system or NR network.

FIG. 1 exemplarily shows one network device and two terminal devices. Optionally, the communication system 100 may include a plurality of network devices and other number of terminal devices may be included in the coverage area of each network device, which is not limited by the embodiment of the present disclosure.

Optionally, the communication system 100 may further include other network entities such as a network controller, a mobility management entity, etc., which is not limited by the embodiment of the present disclosure.

It should be understood that devices with communication functions in the network/system in the embodiment of the present disclosure may be referred to as communication devices. Taking the communication system 100 shown in FIG. 1 as an example, the communication device may include a network device 110 and a terminal device 120 with communication functions, and the network device 110 and the terminal device 120 may be the specific devices described above and will not be described in detail herein. The communication device may also include other devices in the communication system 100, such as network controllers, mobility management entities and other network entities, which are not limited in the embodiment of the present disclosure.

It should be understood that the terms “system” and “network” are often used interchangeably herein. The term “and/or” used herein is only an association relation describing the associated objects, which means that there can be three kinds of relations. For example, A and/or 8, which can mean that A exists alone, A and B exist at the same time, and B exists alone. In addition, the character “/” used herein generally indicates that the related object in the context is of an “or” relationship.

Figure 2:
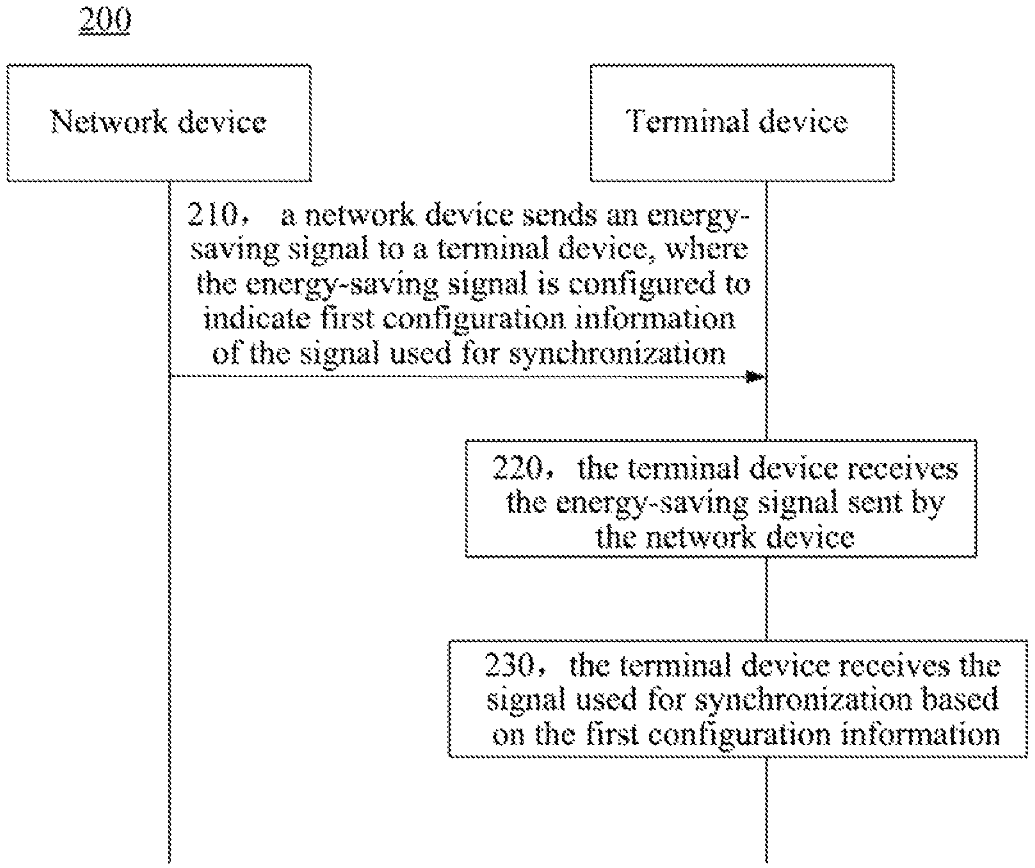
FIG. 2 is a schematic diagram of a wireless communication method provided by an embodiment of the present disclosure.

FIG. 2 is a schematic flowchart of a wireless communication method 200 provided by an embodiment of the present disclosure.

Optionally, in the embodiment of the present disclosure, the wireless communication method 200 is used for time-frequency synchronization for a terminal device in an idle state. However, it should be understood that in the embodiment of the present disclosure, the wireless communication method 200 may also be used for time-frequency synchronization for the terminal device in a connected state.

In 210, a network device sends an energy-saving signal to the terminal device, where the energy-saving signal is configured to indicate first configuration information of a signal used for synchronization.

Optionally, in the embodiment of the present disclosure, the signal used for synchronization may be a tracking Reference Signal (TRS) or an enhanced TRS (eTRS). Of course, the signal used for synchronization may also be other signals, such as a PSS or an SSS.

Optionally, in the embodiment of the present disclosure, the eTRS may occupy more resources than the TRS, for example, in a single slot, the eTRS occupies more symbols or symbol sets or the like than the TRS.

For example, when the wireless communication method is used for communication below 6 GHZ, the TRS occupies one of the following symbol sets in a single slot, while the eTRS occupies at least two of the following symbol sets: $l\in\{4,8\}$, $l\in\{5,9\}$ and $l\in\{6,10\}$.

For another example, when the wireless communication method is used for communication above 6 GHZ, the TRS occupies one of the following symbol sets in a single slot, while the eTRS occupies at least two of the following symbol sets: $l\in\{4,8\}$, $l\in\{5,9\}$, $l\in\{6,10\}$, $l\in\{0,4\}$, $l\in\{1,5\}$, $l\in\{2,6\}$, $l\in\{3,7\}$, $l\in\{7,11\}$, $l\in\{8,12\}$ and $l\in\{9,13\}$.

In the embodiment of the present disclosure, the eTRS may also occupy more slots or frequency domain resources or the like than the TRS.

It should be understood that in the embodiment of the present disclosure, the eTRS may also be referred to as a TRS or other names, which is not specifically limited in the embodiment of the present disclosure.

It should be understood that the energy-saving signal mentioned in the embodiment of the present disclosure may be understood as a signal sent for energy-saving of the terminal device.

For example, if the terminal device needs to receive a message periodically, but the message is not sent to the terminal device every period, it will thus bring great power consumption if the terminal device performs the receiving operation for the message every period. Therefore, the network device can send, to the terminal device, a signal indicative of the terminal device whether the network device sends the message in one period or some periods (for example, the next period), and the terminal device can determine whether to receive the message in the indicated period according to the signal. Therefore, the terminal device does not need to perform the receiving operation every period, thereby reducing the power consumption of the terminal.

Optionally, the aforementioned periodic message may be a paging message. At this time, the energy-saving signal can also be configured to indicate whether there exists a paging message for the terminal device.

However, the aforementioned periodic message may also be other messages, which are not specifically limited in the embodiment of the present disclosure.

For another example, if the terminal device needs to switch periodically from a state with low power consumption to a state with high power consumption, but the terminal device does not need to switch to the state with high power consumption every period for some reasons, it will thus bring relatively great power consumption to the terminal device if the terminal device switches from the state with low power consumption to the state with high power consumption every period. Therefore, the network device can send a signal to the terminal device to indicate whether the terminal device needs to switch to the state with low power consumption from the state with high power consumption in one period or some periods (for example, the next period), and the terminal device can determine whether to change the state in the indicated period according to the signal, thereby reducing the power consumption of the terminal device.

Optionally, the energy-saving signal is used in a Discontinuous Transmission (DTX) scenario, the state with low power consumption may be a dormant state, and the state with high power consumption may be an active state. At this time, the energy-saving signal can also be configured to indicate whether the terminal device enters the active state from the dormant state.

Among them, the aforementioned signal which is used to indicate to the terminal device whether the network device sends a specific message in one period or some periods, or the signal which is used to indicate whether the terminal device enters a state with low power consumption from a state with high power consumption in one period or some periods, can be called an energy-saving signal. However, it should be understood that the embodiment of the present disclosure are not limited thereto, the signal may have other names, and may fall within the protection scope of the embodiment of the present disclosure as long as it realizes the function of the energy-saving signal.

Optionally, in the embodiment of the present disclosure, the energy-saving signal is configured to indicate to the terminal device whether the network device sends a specific message in one period or some periods, or whether the terminal device enters a state with low power consumption from the state with high power consumption in one period or some periods. Following implementations are possible:

in one implementation, different sequences of and/or different resources occupied by the energy-saving signal represent the two aforementioned cases (whether yes or not). For example, when the energy-saving signal includes a sequence 1, it indicates to the terminal device that the network device sends a specific message in one period or some periods, or that the terminal device enters a state with low power consumption from a state with high power consumption in one period or some periods; when the energy-saving signal includes sequence 2, it indicates to the terminal device that the network device does not send a specific message in one period or some periods, or the terminal device does not enter the state with low power consumption from the state with high power consumption in one period or some periods;

in another implementation, sending the energy-saving signal and not sending the energy-saving signal represent the two aforementioned cases (whether yes or not) respectively. For example, when the energy-saving signal is sent, it indicates to the terminal device that the network device sends a specific message in one period or some periods, or the terminal device enters the state with low power consumption from the state with high power consumption in one period or some periods; when the energy-saving signal is not sent, it indicates to the terminal device that the network device does not send a specific message in one period or some periods, or the terminal device does not enter the state with low power consumption from the state with high power consumption in one period or some periods.

Optionally, in the embodiment of the present disclosure, when the energy-saving signal is further configured to indicate that when there exists a paging message for the terminal device, the network device indicates the first configuration information through the energy-saving signal.

Specifically, if there exists a paging message for the terminal device, it means that the terminal device may need to perform synchronization to receive the paging message, and the network device may indicate the first configuration information to the terminal device through the energy-saving signal; if there is no paging message for the terminal device, it means that the terminal device may not need to perform synchronization to receive the paging message, and the network device may not indicate the first configuration information to the terminal device through the energy-saving signal. At this time, optionally, when the energy-saving signal does not carry the first configuration information, the terminal device may not need to perform synchronization.

Optionally, in the embodiment of the present disclosure, when the energy-saving signal is also configured to indicate that the terminal device enters an active state from a dormant state, the network device indicates the first configuration information through the energy-saving signal.

Specifically, if the terminal device needs to enter the active state from the dormant state to perform signal detection, it means that the terminal device may need to perform synchronization for signal detection, and the network device may indicate the first configuration information to the terminal device through the energy-saving signal. At this time, optionally, when the energy-saving signal does not carry the first configuration information, the terminal device may not need to perform synchronization.

Of course, it should be understood that in the embodiment of the present disclosure, even if the energy-saving signal indicates that there is no paging message for the terminal device or the terminal device does not need to enter an active state from a dormant state, the energy-saving signal may also carry the first configuration information, and the terminal device may, after receiving the first configuration information, receive a signal used for synchronization according to the first configuration information, or even after receiving the first configuration information, the terminal device may not need to receive a signal used for synchronization.

Optionally, in the embodiment of the present disclosure, the energy-saving signal can be sent periodically, and the energy-saving signal in each transmission period may carry the above first configuration information, or the energy-saving signals in part of transmission periods may carry the configuration information of the reference signal used for synchronization. For example, if the configuration information of the signal for synchronization does not need to be changed frequently, then the energy-saving signals in part of the transmission periods may carry the configuration information of the reference signal used for synchronization. In this case, even if the energy-saving signal does not carry configuration information at this time, synchronization may be performed according to the configuration information sent by the previous energy-saving signal.

Optionally, in the embodiment of the present disclosure, the configuration information includes at least one of the following signals used for synchronization:

time domain resource information, density information, subcarrier information, bandwidth information, a transmission period, time offset information and time position information.

Among them, the aforementioned time domain resource information may be a symbol occupied by a single slot, where the symbol occupied by a single slot may be one or multiple.

Specifically, symbols that can be used to send the signal used for synchronization may be divided into a plurality of sets, and the first configuration information may include an index of the symbol sets. Where the time domain resource information may include one symbol set or a plurality of symbol sets.

Optionally, in the embodiment of the present disclosure, the symbol set may also be divided into one or more symbol set groups; each group may include one or more symbol sets; the number of symbol sets included in different groups may be the same or different; different groups may or may not have overlapping symbol sets.

The first configuration information may include an index of the symbol set group, and the terminal device may determine the symbol set occupied by the signal used for synchronization based on the index of the symbol set group.

Optionally, in the embodiment of the present disclosure, when the wireless communication method is used for communication below 6 GHZ, the plurality of symbol sets include at least two of the following symbol sets: $l \in \{4,8\}$, $l \in \{5,9\}$ and $l \in \{6,10\}$.

Optionally, in the embodiment of the present disclosure, when the wireless communication method is used for communication above 6 GHZ, the plurality of symbol sets include at least two of the following symbol sets: $l \in \{4,8\}$, $l \in \{5,9\}$, $l \in \{6,10\}$, $l \in \{0,4\}$, $l \in \{1,5\}$, $l \in \{2,6\}$, $l \in \{3,7\}$, $l \in \{7,11\}$, $l \in \{8,12\}$ and $l \in \{9,13\}$.

It should be understood that the symbol set in this embodiment is not limited to the above division, but may be divided in other ways.

It should also be understood that the number of symbols included in each symbol set may be the same or different. Or, there may be a repeated symbol between different symbol sets.

Optionally, in the embodiment of the present disclosure, the network device may notify the terminal device of the division of the symbol sets. Alternatively, the division way of the symbol sets may also be preset on the terminal device.

Optionally, in the embodiment of the present disclosure, the above-mentioned time domain resource information indicated by the energy-saving signal may further include the number and/or indexes of slots occupied by the signal used for synchronization. Where the slot occupied by the signal used for synchronization may be one or multiple. The symbols that can be used for transmission in each slot may be the same, specifically it may be the aforementioned symbol set.

Alternatively, the number and/or indexes of slots occupied by the signal used for synchronization may also be used for other signaling indications, or may be preset on the terminal device.

Optionally, the aforementioned density information may refer to the number of reference signals used for synchronization in a Physical Resource Block (PRB). For example, for the eTRS, the eTRS is single-port information, and the density can be taken $\rho=3$, that is, there are three resource element (RE) in a PRB, and the positions of the three REs in a PRB are K0, K0+4, and K0+8, where K0 is notified by high-level information.

Optionally, in the embodiment of the present disclosure, the aforementioned subcarrier information may refer to the number and/or indexes of subcarriers occupied by the signal used for synchronization.

Optionally, in the embodiment of the present disclosure, the aforementioned bandwidth information may refer to a bandwidth occupied by the signal used for synchronization, and may specifically include the number and/or indexes of the occupied PRBs. For example, for the eTRS, the bandwidth can be a default bandwidth, for example, 52 PRBs; or the bandwidth of an initial active Band Width Part (BWP), or min {the default bandwidth, the initial active BWP}.

Optionally, in the embodiment of the present disclosure, for the TRS or the eTRS, the aforementioned transmission period may be 10 ms, 20 ms, 40 ms, 80 ms, etc.

Optionally, in the embodiment of the present disclosure, the aforementioned time offset information may be determined according to a value of the period, and if the value of the period is 10 ms, the time offset may be 0, 1, 2 . . . 9 ms.

Optionally, in the embodiment of the present disclosure, the aforementioned time position information may be an offset of the signal used for synchronization relative to a further signal, for example, a relative paging message may be sent ahead of time T. At this time, the signal used for synchronization may be a signal transmitted aperiodically.

Optionally, the signal used for synchronization may also be a semi-continuous periodic signal, and then the configuration information may include information such as a transmission period, a time offset, and the number of periods for which the signal used for synchronization continues.

Optionally, in the embodiment of the present disclosure, the energy-saving signal may indicate the configuration information in an explicit manner (for example, a sequence) or in an implicit manner (for example, an occupied resource).

Optionally, in the embodiment of the present disclosure, the energy-saving signal indicates the first configuration information through an included sequence and/or an occupied resource, where different sequences and/or occupied resources indicate different configuration information of the signal used for synchronization.

Among them, different sequences can be implemented as different paging shifts (Zadoff-Chu (ZC) sequences for the energy-saving signal), different orthogonal codes and the like.

Among them, different sequences and/or occupied resources indicate different configuration information, which means that for one or some configuration parameters of the same type, different sequences and/or occupied resources indicate different values of the one or some configuration parameters.

For example, a first sequence is used to represent first time domain resource information, first density information, first subcarrier information, first bandwidth information, a first period and first time offset information; a second sequence is used to represent second time domain resource information, second density information, second subcarrier information, second bandwidth information, a second period and second time offset information.

Optionally, when the configuration information includes a plurality of configuration parameters, if values of part of the configuration parameters are different, the configuration information can be considered to be different.

For example, a first sequence is used to represent first time domain resource information, first density information, first subcarrier information, first bandwidth information, a second period and second time offset information. A second sequence is used to represent first time domain resource information, first density information, first subcarrier information, first bandwidth information, a first period and first time offset information.

Of course, different sequences and/or occupied resources indicate different configuration information, which may also mean that different sequences and/or occupied resources indicate different types of configuration parameters.

For example, a first sequence is used to represent first time domain resource information; a second sequence is used to represent first time domain resource information and first density information.

Optionally, in the embodiment of the present disclosure, the configuration information of the signal used for synchronization includes the first configuration information and the second configuration information. That is, the energy-saving signal carries part of the configuration information of the signal used for synchronization. Where the second configuration information may be at least part of the configuration information among the configuration information of the signal used for synchronization except for the configuration information included in the first configuration information.

Among them, the second configuration information may be sent by the network device to the terminal device through other signaling (for example, through higher layer signaling). In this case, the terminal device may receive the signal used for synchronization based on the first configuration information and the second configuration information.

Alternatively, the second configuration information may also be preset on the terminal device.

It should also be understood that the configuration information of the signal used for synchronization may be partly carried in the energy-saving signal, partly carried in the higher layer signaling and partly preset on the terminal device.

In 220, the terminal device receives the energy-saving signal sent by the network device.

In 230, the terminal device receives the signal used for synchronization based on the first configuration information.

Optionally, in the embodiment of the present disclosure, when the energy-saving signal is further configured to indicate that there exists a paging message for the terminal device, the terminal device receives the signal used for synchronization based on the first configuration information.

Specifically, if the energy-saving signal is further configured to indicate that there exists a paging message for the terminal device, it means that the terminal device needs to perform synchronization to receive the paging message, and the terminal device may receive the signal used for synchronization based on the first configuration information. If the energy-saving signal is further configured to indicate that there is no paging message for the terminal device, it means that the terminal device does not need to perform synchronization, and the terminal device may not receive the signal used for synchronization. Of course, even if the energy-saving signal is further configured to indicate that there is no paging message for the terminal device, the terminal device may receive the signal used for synchronization based on the first configuration information to perform synchronization.

Optionally, in the embodiment of the present disclosure, when the energy-saving signal is further configured to indicate that the terminal device enters an active state from a dormant state, the terminal device receives the signal used for synchronization based on the first configuration information.

Specifically, if the energy-saving signal is further configured to indicate that the terminal device enters an active state from a dormant state, it means that the terminal device needs to perform synchronization for information monitoring. In this case, the terminal device may receive the signal used for synchronization based on the first configuration information. If the energy-saving signal is further configured to indicate that the terminal device does not need to enter an active state from a dormant state, it means that the terminal device does not need to perform synchronization, and the terminal device may not receive the signal used for synchronization. Of course, even if the energy-saving signal indicates that the terminal device does not need to enter an active state from a dormant state, the terminal device may receive the signal used for synchronization based on the first configuration information.

Therefore, in the embodiment of the present disclosure, the network device sends an energy-saving signal indicating the first configuration information of the signal used for synchronization to the terminal device, then the terminal device may obtain, based on the energy-saving signal, configuration information, so as to receive the signal used for synchronization, which may improve the efficiency of the synchronization and reduce the power consumption of the terminal. Furthermore, the manner for indicating the configuration information of the signal used for synchronization based on the energy-saving signal can realize more dynamic configuration of the signal used for synchronization, so as to better match a channel condition of the terminal, a load condition of the network and the like.

Figure 3:
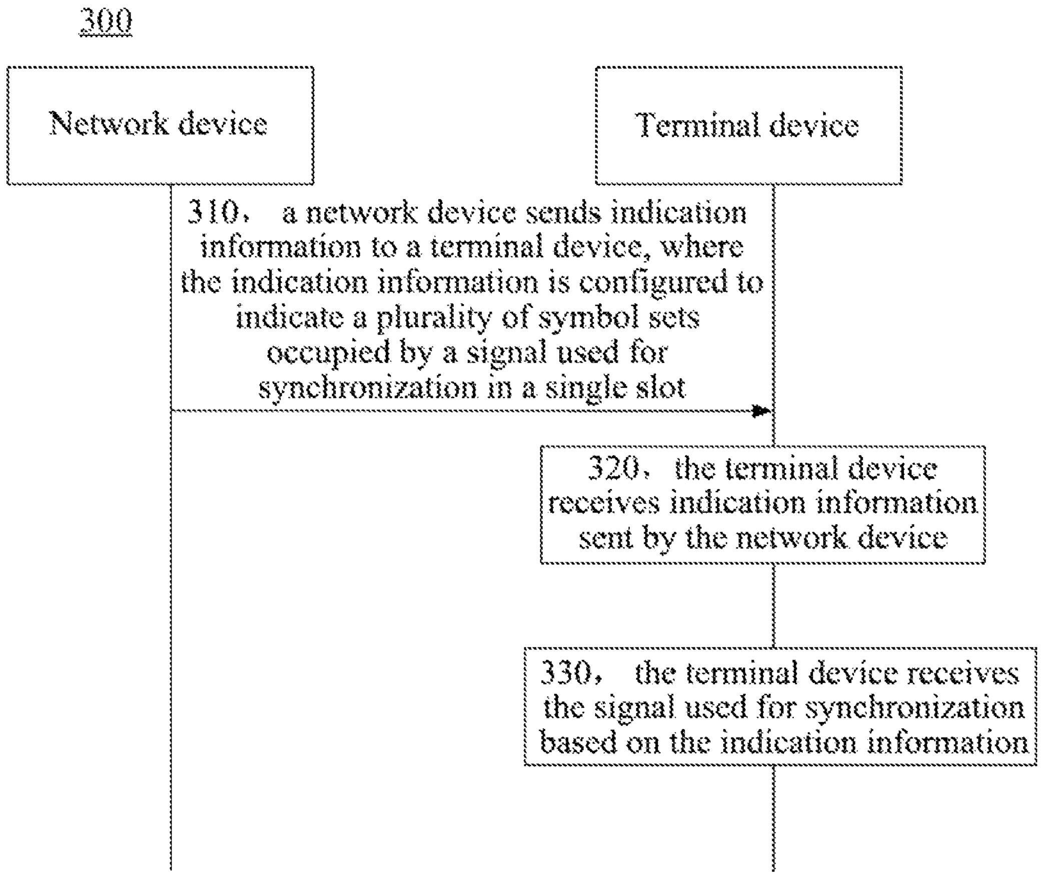
FIG. 3 is a schematic diagram of a wireless communication method provided by an embodiment of the present disclosure.

FIG. 3 is a schematic flowchart of a wireless communication method 300 according to an embodiment of the present disclosure.

Optionally, in the embodiment of the present disclosure, the wireless communication method 300 is used for time-frequency synchronization for a terminal device in an idle state. However, it should be understood that in the embodiment of the present disclosure, the wireless communication method 300 may also be used for the time-frequency synchronization for the terminal device in a connected state.

In 310, a network device sends indication information to the terminal device, where the indication information is configured to indicate a plurality of symbol sets occupied by a signal used for synchronization in a single slot.

Optionally, in the embodiment of the present disclosure, the signal used for synchronization may be a tracking reference signal (TRS) or an enhanced TRS (eTRS). Of course, the signal used for synchronization may also be other signals, such as a PSS or an SSS.

Optionally, in the embodiment of the present disclosure, the eTRS may occupy more resources than the TRS, for example, in a single slot, the eTRS occupies more symbols or symbol sets or the like than the TRS.

For example, when the wireless communication method is used for communication below 6 GHZ, the TRS occupies one of the following symbol sets in a single slot, while the eTRS occupies at least two of the following symbol sets: $l \in \{4,8\}$, $l \in \{5,9\}$ and $l \in \{6,10\}$.

For another example, when the wireless communication method is used for communication above 6 GHZ, the TRS occupies one of the following symbol sets in a single slot, while the eTRS occupies at least two of the following symbol sets: $l \in \{4,8\}$, $l \in \{5,9\}$, $l \in \{6,10\}$, $l \in \{0,4\}$, $l \in \{1,5\}$, $l \in \{2,6\}$, $l \in \{3,7\}$, $l \in \{7,11\}$, $l \in \{8,12\}$ and $l \in \{9,13\}$.

In the embodiment of the present disclosure, the eTRS may also occupy more slots or frequency domain resources or the like than the TRS.

It should be understood that in the embodiment of the present disclosure, the eTRS may also be referred to as a TRS or other names, which is not specifically limited in the embodiment of the present disclosure.

Optionally, in the embodiment of the present disclosure, each symbol set includes at least two symbols. The network device may notify the terminal device of the index of the symbol set, so that the terminal device may determine the symbol set based on the index.

Optionally, in the embodiment of the present disclosure, the symbol set may also be divided into one or more symbol set groups; each group may include one or more symbol sets; the number of symbol sets included in different groups may be the same or different; different groups may or may not have overlapping symbol sets.

The first configuration information may include an index of the symbol set group, and the terminal device may determine the symbol set occupied by the signal for synchronization based on the index of the symbol set group.

Optionally, in the embodiment of the present disclosure, when the wireless communication method is used for communication below 6 GHZ, the plurality of symbol sets include at least two of the following symbol sets: $l \in \{4,8\}$, $l \in \{5,9\}$ and $l \in \{6,10\}$.

Optionally, in the embodiment of the present disclosure, when the wireless communication method is used for communication above 6 GHZ, the plurality of symbol sets include at least two of the following symbol sets: $l \in \{4,8\}$, $l \in \{5,9\}$, $l \in \{6,10\}$, $l \in \{0,4\}$, $l \in \{1,5\}$, $l \in \{2,6\}$, $l \in \{3,7\}$, $l \in \{7,11\}$, $l \in \{8,12\}$ and $l \in \{9,13\}$.

Optionally, in the embodiment of the present disclosure, the indication information is further configured to indicate the number of slots occupied by the signal used for synchronization.

It should be understood that the symbol set in this embodiment is not limited to the above division, but may be divided in other ways.

It should also be understood that the number of symbols included in each symbol set may be the same or different. Or, there may be a repeated symbol between different symbol sets.

Optionally, in the embodiment of the present disclosure, the network device may notify the terminal device of the division of the symbol sets. Alternatively, the division way of the symbol set may also be preset on the terminal device.

Optionally, in the embodiment of the present disclosure, the indication information may also indicate the number and/or indexes of the slots occupied by the signal used for synchronization. Where the slot occupied by the signal used for synchronization may be one or multiple. The symbols that can be used for transmission in each slot may be the same, specifically it may be the aforementioned symbol set.

Alternatively, the number and/or indexes of slots occupied by the signal used for synchronization may also be used for other signaling indications, or may be preset on the terminal device.

It should be understood that the indication information may also indicate other configuration information of the signal used for synchronization, for example, at least one of density information, subcarrier information, bandwidth information, a transmission period, time offset information or time position information. For specific description, please refer to the description in the method 200, which will not be repeated herein for brevity.

Optionally, in the embodiment of the present disclosure, the indication information is carried in a broadcast message, radio resource control (RRC) signaling or an energy-saving signal.

Optionally, in the embodiment of the preset application, the energy-saving signal is configured to indicate whether there exists a paging message for the terminal device.

Optionally, in the embodiment of the preset application, the energy-saving signal is further configured to indicate whether the terminal device enters an active state from a dormant state.

Optionally, in the embodiment of the preset application, when the energy-saving signal is further configured to indicate that there exists a paging message for the terminal device, the network device carries the indication information through the energy-saving signal.

Specifically, if there exists a paging message for the terminal device, it means that the terminal device may need to perform synchronization to receive the paging message, the network device may carry the indication information to the terminal device through an energy-saving signal; if there is no paging message for the terminal device, it means that the terminal device may not need to perform synchronization to receive the paging message, the network device may not need to send the indication information to the terminal device through an energy-saving signal. At this time, optionally, when the energy-saving signal does not carry the indication information, the terminal device may not perform synchronization.

Optionally, in the embodiment of the preset application, when the energy-saving signal is further configured to indicate that the terminal device enters an active state from a dormant state, the network device carries the indication information through the energy-saving signal.

Specifically, if the terminal device needs to enter an active state from a dormant state for signal detection, it means that the terminal device may need to perform synchronization for signal detection, and the network device may send the indication information to the terminal device through the energy-saving signal. If the terminal device does not need to enter an active state from a dormant state, it means that the terminal device may not need to perform signal detection, and the network device may not need to send the indication information to the terminal device through the energy-saving signal. At this time, optionally, when the energy-saving signal does not carry the indication information, the terminal device may not perform synchronization.

Of course, it should be understood that in the embodiment of the present disclosure, even if the energy-saving signal indicates that there is no paging message for the terminal device or the terminal device does not need to enter an active state from a dormant state, the energy-saving signal may also carry the indication information, and the terminal device may receive the signal used for synchronization according to the indication information after receiving the indication information, so as to perform synchronization; or even after receiving the indication information, the terminal device does not need to receive a signal used for synchronization to perform synchronization.

Optionally, in this embodiment of the present disclosure, the energy-saving signal may be sent periodically, and the energy-saving signal in each transmission period may carry the above-mentioned indication information, or the energy-saving signals in part of transmission periods may carry the indication information mentioned above. For example, if the symbol set of the above-mentioned signal used for synchronization does not need to be changed frequently, then the energy-saving signals in part of transmission periods may carry the indication information of the above-mentioned symbol set. At this time, even if the energy-saving signal does not carry the indication information, synchronization can be performed according to the indication information sent through a previous energy-saving signal.

In 320, the terminal device receives indication information sent by the network device, where the indication information is configured to indicate a plurality of symbol sets occupied by a signal used for synchronization in a single slot.

In 330, the terminal device receives the signal used for synchronization based on the indication information.

Optionally, in the embodiment of the present disclosure, when the energy-saving signal is further configured to indicate that there exists a paging message for the terminal device, the terminal device receives the signal used for synchronization based on the indication information.

Specifically, if the energy-saving signal is further configured to indicate that there exists a paging message for the terminal device, it means that the terminal device needs to perform synchronization to receive the paging message, and at this time, the terminal device may receive the signal used for synchronization based on the indication information. If the energy-saving signal is further configured to indicate that there is no paging message for the terminal device, it means that the terminal device does not need to perform synchronization, and the terminal device may not receive the signal used for synchronization at this time. Of course, even if the energy-saving signal is further configured to indicate that there is no paging message for the terminal device, the terminal device may receive the signal used for synchronization based on the indication information.

Optionally, in the embodiment of the present disclosure, when the energy-saving signal is further configured to indicate that the terminal device enters an active state from a dormant state, the terminal device receives the signal used for synchronization based on the indication information.

Specifically, if the energy-saving signal is further configured to indicate that the terminal device enters an active state from a dormant state, it means that the terminal device needs to perform synchronization for information monitoring, and at this time, the terminal device may receive the signal used for synchronization based on the indication information. If the energy-saving signal is further configured to indicate that the terminal device does not need to enter an active state from a dormant state, it means that the terminal device does not need to perform synchronization, and the terminal device may not receive the signal used for synchronization at this time. Of course, even if the energy-saving signal indicates that the terminal device does not need to enter an active state from a dormant state, the terminal device may receive the signal used for synchronization based on the indication information.

Therefore, in the embodiment of the present disclosure, the network device sends indication information to the terminal device, the indication information is configured to indicate a plurality of symbol sets occupied by the signal used for synchronization in a single slot, so that the terminal device may occupy a plurality of symbol sets in a single slot to receive the signal used for synchronization, thereby improving synchronization efficiency.

Figure 4:
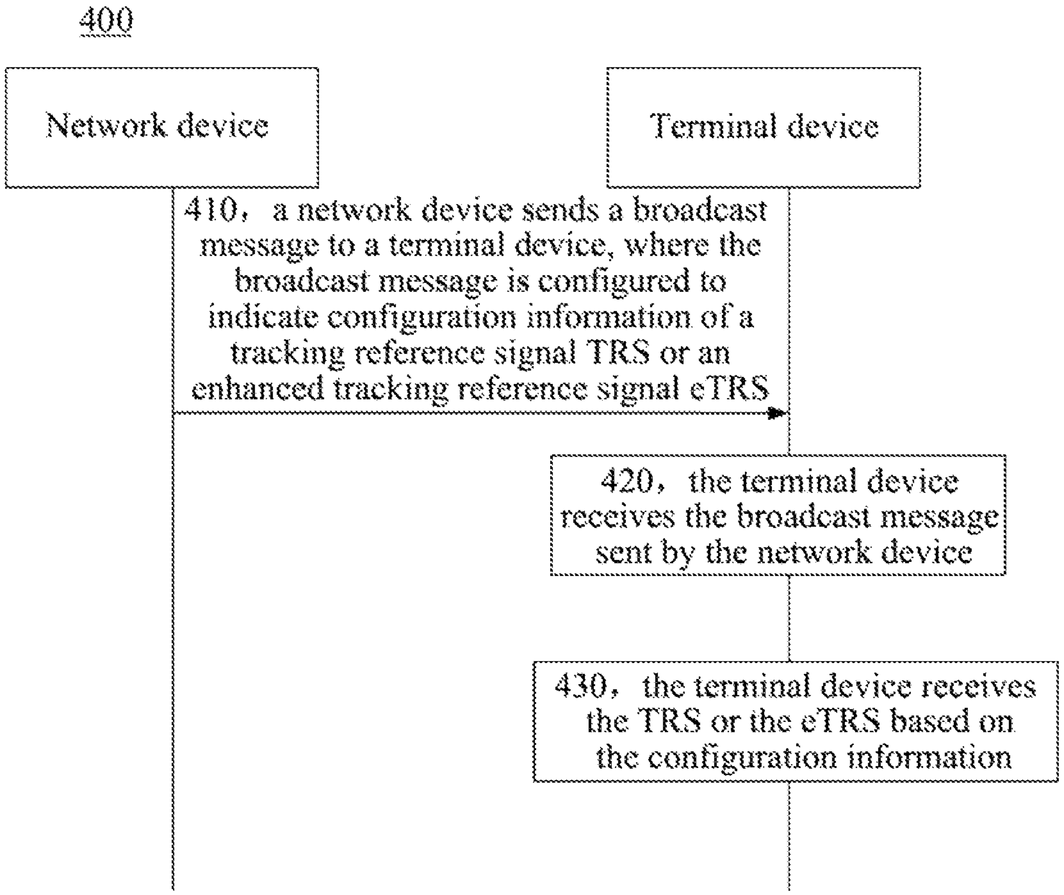
FIG. 4 is a schematic diagram of a wireless communication method provided by an embodiment of the present disclosure.

FIG. 4 is a schematic flowchart of a wireless communication method 400 according to an embodiment of the present disclosure.

Optionally, in the embodiment of the present disclosure, the wireless communication method 400 is used for time-frequency synchronization for a terminal device in an idle state. However, it should be understood that in the embodiment of the present disclosure, the wireless communication method 400 may also be used for the time-frequency synchronization for the terminal device in a connected state.

In 410, a network device sends a broadcast message to the terminal device, where the broadcast message is configured to indicate configuration information of a tracking reference signal TRS or an enhanced tracking reference signal eTRS.

Optionally, in the embodiment of the present disclosure, the eTRS may occupy more resources than the TRS, for example, in a single slot, the eTRS occupies more symbols or symbol sets or the like than the TRS.

For example, when the wireless communication method is used for communication below 6 GHZ, the TRS occupies one of the following symbol sets in a single slot, while the eTRS occupies at least two of the following symbol sets: $l\in\{4,8\}$, $l\in\{5,9\}$ and $l\in\{6,10\}$.

For another example, when the wireless communication method is used for communication above 6 GHZ, the TRS occupies one of the following symbol sets in a single slot, while the eTRS occupies at least two of the following symbol sets: $l\in\{4,8\}$, $l\in\{5,9\}$, $l\in\{6,10\}$, $l\in\{0,4\}$, $l\in\{1,5\}$, $l\in\{2,6\}$, $l\in\{3,7\}$, $l\in\{7,11\}$, $l\in\{8,12\}$ and $l\in\{9,13\}$.

In the embodiment of the present disclosure, the eTRS may also occupy more slots or frequency domain resources or the like than the TRS.

It should be understood that in the embodiment of the present disclosure, the eTRS may also be referred to as a TRS or other names, which is not specifically limited in the embodiment of the present disclosure.

Optionally, in the embodiment of the present disclosure, the configuration information includes at least one of the following of the TRS or the eTRS:

time domain resource information, density information, subcarrier information, bandwidth information, a transmission period, time offset information and time position information.

Optionally, in the embodiment of the present disclosure, the time domain resource information of the TRS or the eTRS is configured to indicate a plurality of symbol sets occupied by the TRS or the eTRS in a single slot and/or a slot occupied by the TRS or the eTRS.

Optionally, in the embodiment of the present disclosure, the network device may notify the terminal device of the index of the symbol set, so that the terminal device may determine the symbol set based on the index.

Optionally, in the embodiment of the present disclosure, the symbol set may also be divided into one or more symbol set groups; each group may include one or more symbol sets; the number of symbol sets included in different groups may be the same or different; different groups may or may not have overlapping symbol sets.

The configuration information may include an index of the symbol set group, and the terminal device may determine the symbol set occupied by the signal used for synchronization based on the index of the symbol set group.

Optionally, in the embodiment of the present disclosure, when the wireless communication method is used for communication below 6 GHZ, the plurality of symbol sets include at least two of the following symbol sets: $l\in\{4,8\}$, $l\in\{5,9\}$ and $l\in\{6,10\}$.

Optionally, in the embodiment of the present disclosure, when the wireless communication method is used for communication above 6 GHZ, the plurality of symbol sets include at least two of the following symbol sets: $l\in\{4,8\}$, $l\in\{5,9\}$, $l\in\{6,10\}$, $l\in\{0,4\}$, $l\in\{1,5\}$, $l\in\{2,6\}$, $l\in\{3,7\}$, $l\in\{7,11\}$, $l\in\{8,12\}$ and $l\in\{9,13\}$.

Among them, for the introduction of the configuration information in the broadcast message mentioned above, please refer to the description in the method 200, which will not be repeated herein for brevity.

Optionally, in the embodiment of the present disclosure, the broadcast message may carry part of the configuration information of the TRS or the eTRS, and other part of the configuration information may be realized by at least two of the following ways; sending by through an energy-saving signal, sending through RRC signaling, or being preset on the terminal device, etc.

In 420, the terminal device receives the broadcast message sent by the network device.

In 430, the terminal device receives the TRS or the eTRS based on the configuration information.

Therefore, in the embodiment of the present disclosure, the network device sends a broadcast message to the terminal device, where the broadcast message is configured to indicate configuration information of the tracking reference signal TRS or the enhanced tracking reference signal eTRS, so that the terminal device may receive the TRS or the eTRS based on the broadcast message. Where transmission of the configuration information of the TRS or the eTRS based on broadcast information can improve transmission efficiency of the configuration information.

Figure 5:
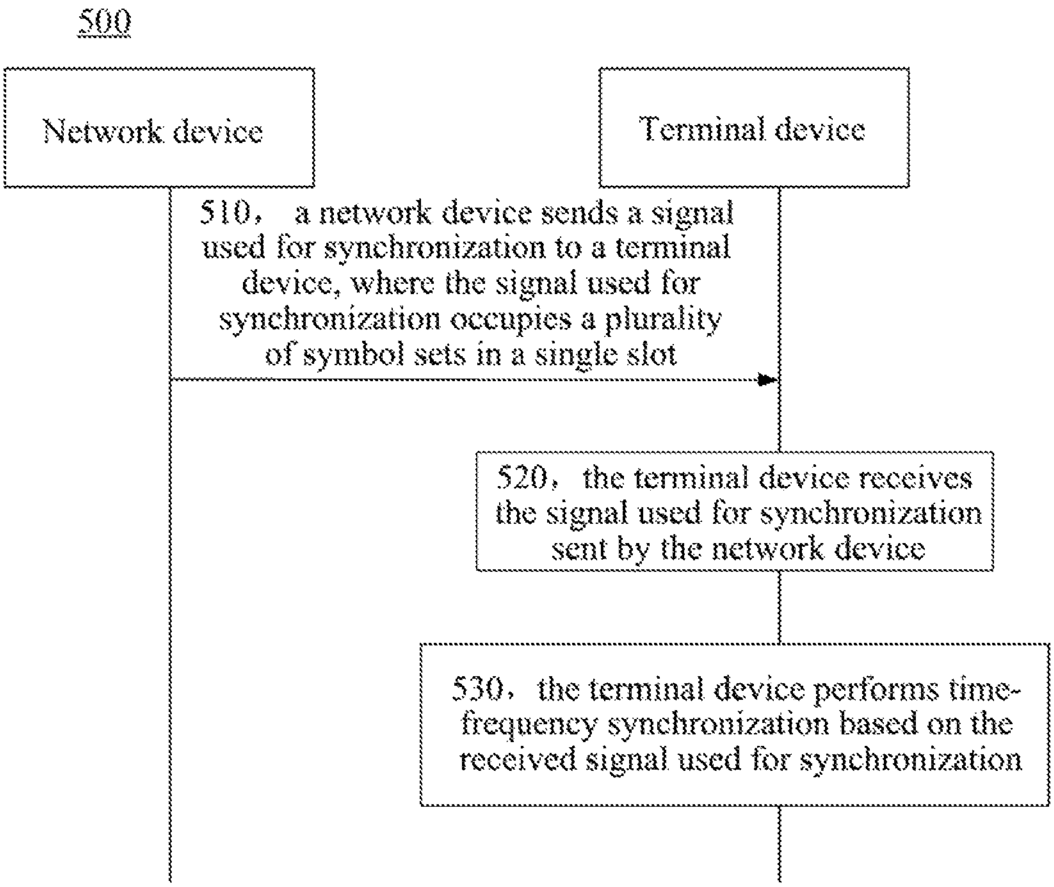
FIG. 5 is a schematic diagram of a wireless communication method provided by an embodiment of the present disclosure.

FIG. 5 is a schematic flowchart of a wireless communication method 500 according to an embodiment of the present disclosure. The method 500 includes at least pan of the following contents.

Optionally, in the embodiment of the present disclosure, the wireless communication method 500 is used for time-frequency synchronization for a terminal device in an idle state. However, it should be understood that in the embodiment of the present disclosure, the wireless communication method 500 may also be used for the time-frequency synchronization for the terminal device in a connected state.

In 510, a network device sends a signal used for synchronization to the terminal device, where the signal used for synchronization occupies a plurality of symbol sets in a single slot.

Optionally, in the embodiment of the present disclosure, the signal used for synchronization may be a tracking reference signal (TRS) or an enhanced TRS (eTRS). Of course, the signal used for synchronization may also be other signals, such as a PSS or an SSS.

Optionally, in the embodiment of the present disclosure, the eTRS may occupy more resources than the TRS, for example, in a single slot, the eTRS occupies more symbols or symbol sets or the like than the TRS.

For example, when the wireless communication method is used for communication below 6 GHZ, the TRS occupies one of the following symbol sets in a single slot, while the eTRS occupies at least two of the following symbol sets: $l \in \{4,8\}$, $l \in \{5,9\}$ and $l \in \{6,10\}$.

For another example, when the wireless communication method is used for communication above 6 GHZ, the TRS occupies one of the following symbol sets in a single slot, while the eTRS occupies at least two of the following symbol sets: $l \in \{4,8\}$, $l \in \{5,9\}$, $l \in \{6,10\}$, $l \in \{0,4\}$, $l \in \{1,5\}$, $l \in \{2,6\}$, $l \in \{3,7\}$, $l \in \{7,11\}$, $l \in \{8,12\}$ and $l \in \{9,13\}$.

In the embodiment of the present disclosure, the eTRS may also occupy more slots or frequency domain resources or the like than the TRS.

It should be understood that in the embodiment of the present disclosure, the eTRS may also be referred to as a TRS or other names, which is not specifically limited in the embodiment of the present disclosure.

Optionally, in the embodiment of the present disclosure, each symbol set includes at least two symbols.

Optionally, in the embodiment of the present disclosure, the network device may notify the terminal device of the index of the symbol set, so that the terminal device may determine the symbol set based on the index.

Optionally, in the embodiment of the present disclosure, the symbol set may also be divided into one or more symbol set groups; each group may include one or more symbol sets; the number of symbol sets included in different groups may be the same or different; different groups may or may not have overlapping symbol sets.

The configuration information sent by the network device to the terminal device may include an index of the symbol set group, and the terminal device may determine the symbol set occupied by the signal used for synchronization based on the index of the symbol set group.

Optionally, in the embodiment of the present disclosure, when the wireless communication method is used for communication below 6 GHz, the plurality of symbol sets include at least two of the following symbol sets: $l \in \{4,8\}$, $l \in \{5,9\}$ and $l \in \{6,10\}$.

Optionally, in the embodiment of the present disclosure, when the wireless communication method is used for communication above 6 GHZ, the plurality of symbol sets include at least two of the following symbol sets: $l \in \{4,8\}$, $l \in \{5,9\}$, $l \in \{6,10\}$, $l \in \{0,4\}$, $l \in \{1,5\}$, $l \in \{2,6\}$, $l \in \{3,7\}$, $l \in \{7,11\}$, $l \in \{8,12\}$ and $l \in \{9,13\}$.

It should be understood that the symbol set in this embodiment is not limited to the above division, but may be divided in other ways.

It should also be understood that the number of symbols included in each symbol set may be the same or different. Or, there may be a repeated symbol between different symbol sets.

Optionally, in the embodiment of the present disclosure, the network device may notify the terminal device of the division of the symbol set. Alternatively, the division way of the symbol set may also be preset on the terminal device.

Optionally, in the embodiment of the present disclosure, the signal used for synchronization may occupy one or more slots.

The symbols that can be used for transmission in each slot may be the same, specifically it may be the aforementioned symbol set. Of course, the symbols used for transmission in each slot may also be different.

Optionally, in the embodiment of the present disclosure, the network device may send configuration information of the signal used for synchronization to the terminal device, so that the terminal device may receive the configuration information and receive the signal used for synchronization based on the configuration information.

Optionally, the indication information indicating the configuration information may be carried in an energy-saving signal, RRC signaling and/or a broadcast message.

Optionally, please refer to the description of the above methods 200-400 for the sending manner of the configuration information and/or content carried in the configuration information of the signal used for synchronization, which will not be repeated herein for brevity.

In 520, the terminal device receives the signal used for synchronization sent by the network device.

In 530, the terminal device performs time-frequency synchronization based on the received signal used for synchronization.

Therefore, in the embodiment of the present disclosure, the signal used for synchronization sent by the network device to the terminal device occupies a plurality of symbol sets in a single slot, so that the terminal device may occupy a plurality of symbol sets in a single slot to receive the signal used for synchronization, thereby improving synchronization efficiency.

It should be understood that although the above methods 200, 300, 400 and 500 and their embodiments are described separately and independently, each method and embodiment can be used in combination, and the description of each method can be used in the description of other methods, for example, the explanation of the energy-saving signal and the description of configuration information, etc. Among them, when the description of a certain method is applied to other methods, characteristics of the certain method that do not have to exist for the description in other methods are not required. Therefore, for the sake of brevity, the details of each method are not repeated in the embodiment of the present disclosure.

It should also be understood that although the method of the embodiment of the present disclosure is described based on the signal used for synchronization, the embodiment of the present disclosure is not limited thereto, and the method of the embodiment of the present disclosure may be used in the configuration of a reference signal (for example, a channel state information-reference signal (CSI-RS)) or system information, for example, the configuration information of the reference signal or system information may be sent through the energy-saving signal, where reference may be made to the above description for the specific implementation, which will not be repeated herein for brevity.

Figure 6:
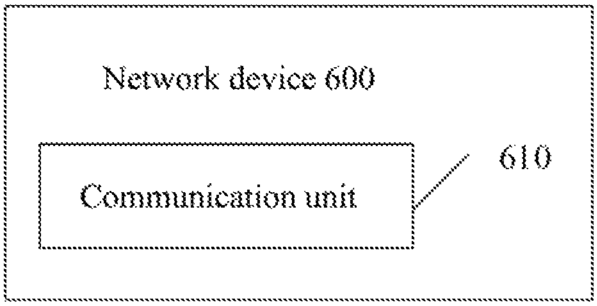
FIG. 6 is a schematic block diagram of a network device provided by an embodiment of the present disclosure.

FIG. 6 is a schematic block diagram of a network device according to an embodiment of the present disclosure. As shown in FIG. 6, the network device 600 includes a communication unit 610.

Optionally, in the embodiment of the present disclosure, the communication unit 610 is configured to:

send an energy-saving signal to the terminal device, where the energy-saving signal is configured to indicate first configuration information of a signal used for synchronization.

Optionally, in the embodiment of the present disclosure, the energy-saving signal is further configured to indicate whether there exists a paging message for the terminal device; or the energy-saving signal is further configured to indicate whether the terminal device enters an active state from a dormant state.

Optionally, in the embodiment of the present disclosure, when the energy-saving signal is further configured to indicate that there exists a paging message for the terminal device, the energy-saving signal is configured to indicate the first configuration information; or when the energy-saving signal is further configured to indicate that the terminal device enters an active state from a dormant state, the energy-saving signal is configured to indicate the first configuration information.

Optionally, in the embodiment of the present disclosure, the first configuration information includes at least one of the following signals used for synchronization:

time domain resource information, density information, subcarrier information, bandwidth information, a transmission period, time offset information and time position information.

Optionally, in the embodiment of the present disclosure, the time domain resource information of the signal used for synchronization is configured to indicate a plurality of symbol sets occupied by the signal used for synchronization in a single slot and/or a slot occupied by the signal used for synchronization.

Optionally, in the embodiment of the present disclosure, when the terminal device is used for communication below 6 GHZ, the plurality of symbol sets include at least two of the following symbol sets: $l\in\{4,8\}$, $l\in\{5,9\}$ and $l\in\{6,10\}$; or when the terminal device is used for communication above 6 GHZ, the plurality of symbol sets include at least two of the following symbol sets: $l\in\{4,8\}$, $l\in\{5,9\}$, $l\in\{6,10\}$, $l\in\{0,4\}$, $l\in\{1,5\}$, $l\in\{2,6\}$, $l\in\{3,7\}$, $l\in\{7,11\}$, $l\in\{8,12\}$ and $l\in\{9,13\}$.

Optionally, in the embodiment of the present disclosure, the energy-saving signal indicates the first configuration information through an included sequence and/or an occupied resource;

where different sequences and/or occupied resources indicate different configuration information of the signal used for synchronization.

Optionally, in the embodiment of the present disclosure, the configuration information of the signal used for synchronization includes the first configuration information and second configuration information, and the second configuration information is configured to indicate all or part of configuration information not included in the first configuration information in the configuration information of the signal used for synchronization; and the communication unit 610 is further configured to:

send higher layer signaling to the terminal device, where the higher layer signaling is configured to indicate the second configuration information.

Optionally, in the embodiment of the present disclosure, the signal used for synchronization is used for time-frequency synchronization for the terminal device in an idle state.

The network device 600 can implement the corresponding operations implemented by the network device in the method 200, which will not be repeated herein for brevity.

Optionally, in the embodiment of the present disclosure, the communication unit 610 is configured to:

send indication information to a terminal device, where the indication information is configured to indicate a plurality of symbol sets occupied by a signal used for synchronization in a single slot.

Optionally, in the embodiment of the present disclosure, each symbol set includes at least two symbols.

Optionally, in the embodiment of the present disclosure, when the terminal device is used for communication below 6 GHZ, the plurality of symbol sets include at least two of the following symbol sets: $l\in\{4,8\}$, $l\in\{5,9\}$ and $l\in\{6,10\}$; or when the terminal device is used for communication above 6 GHZ, the plurality of symbol sets include at least two of the following symbol sets: $l\in\{4,8\}$, $l\in\{5,9\}$, $l\in\{6,10\}$, $l\in\{0,4\}$, $l\in\{1,5\}$, $l\in\{2,6\}$, $l\in\{3,7\}$, $l\in\{7,11\}$, $l\in\{8,12\}$ and $l\in\{9,13\}$.

Optionally, in the embodiment of the present disclosure, the indication information is further configured to indicate a slot occupied by the signal used for synchronization.

Optionally, in the embodiment of the present disclosure, the indication information is carried in a broadcast message, radio resource control RRC signaling or an energy-saving signal.

Optionally, in the embodiment of the present disclosure, the energy-saving signal is configured to indicate whether there exists a paging message for the terminal device; or the energy-saving signal is configured to indicate whether the terminal device enters an active state from a dormant state.

Optionally, in the embodiment of the present disclosure, the signal used for synchronization is used for time-frequency synchronization for the terminal device in an idle state.

The network device 600 can implement the corresponding operations implemented by the network device in the method 300, which will not be repeated herein for brevity.

Optionally, in the embodiment of the present disclosure, the communication unit 610 is configured to:

send a broadcast message to the terminal device, where the broadcast message is configured to indicate configuration information of a tracking reference signal TRS or an enhanced tracking reference signal eTRS.

Optionally, in the embodiment of the present disclosure, the configuration information includes at least one of the following of the TRS or the eTRS:

time domain resource information, density information, subcarrier information, bandwidth information, a transmission period, time offset information and time position information.

Optionally, in the embodiment of the present disclosure, the time domain resource information of the TRS or the eTRS is configured to indicate a symbol set occupied by the TRS or the eTRS in a single slot and/or a slot occupied by the TRS or the eTRS.

Optionally, in the embodiment of the present disclosure, the signal used for synchronization is used for time-frequency synchronization for the terminal device in an idle state.

The network device 600 can implement the corresponding operations implemented by the network device in the method 400, which will not be repeated herein for brevity.

Optionally, in the embodiment of the present disclosure, the communication unit 610 is configured to:

send a signal used for synchronization to a terminal device, where the signal used for synchronization occupies a plurality of symbol sets in a single slot.

Optionally, in the embodiment of the present disclosure, each symbol set includes at least two symbols.

Optionally, in the embodiment of the present disclosure, when the terminal device is used for communication below 6 GHZ, the plurality of symbol sets include at least two of the following symbol sets: $l \in \{4,8\}$, $l \in \{5,9\}$ and $l \in \{6,10\}$; or when the terminal device is used for communication above 6 GHZ, the plurality of symbol sets include at least two of the following symbol sets: $l \in \{4,8\}$, $l \in \{5,9\}$, $l \in \{6,10\}$, $l \in \{0,4\}$, $l \in \{1,5\}$, $l \in \{2,6\}$, $l \in \{3,7\}$, $l \in \{7,11\}$, $l \in \{8,12\}$ and $l \in \{9,13\}$.

Optionally, in the embodiment of the present disclosure, the signal used for synchronization occupies one or more slots.

Optionally, in the embodiment of the present disclosure, the communication unit 610 is further configured to:

send indication information to the terminal device, where the indication information is configured to indicate configuration information of the signal used for synchronization.

Optionally, in the embodiment of the present disclosure, the configuration information includes at least one of the following signals for synchronization:

time domain resource information, density information, subcarrier information, bandwidth information, a transmission period, time offset information and time position information.

Optionally, in the embodiment of the present disclosure, the time domain resource information of the signal used for synchronization is configured to indicate the plurality of symbol sets occupied by the signal used for synchronization in a single slot and/or a slot occupied by the signal used for synchronization.

Optionally, in the embodiment of the present disclosure, the indication information is carried in an energy-saving signal, radio resource control RRC signaling or a broadcast message.

Optionally, in the embodiment of the present disclosure, the energy-saving signal is configured to indicate whether there exists a paging message for the terminal device; or the energy-saving signal is configured to indicate whether the terminal device enters an active state from a dormant state.

Optionally, in the embodiment of the present disclosure, the signal used for synchronization is used for time-frequency synchronization for the terminal device in an idle state.

The network device 600 can implement the corresponding operations implemented by the network device in the method 500, which will not be repeated herein for brevity.

Figure 7:
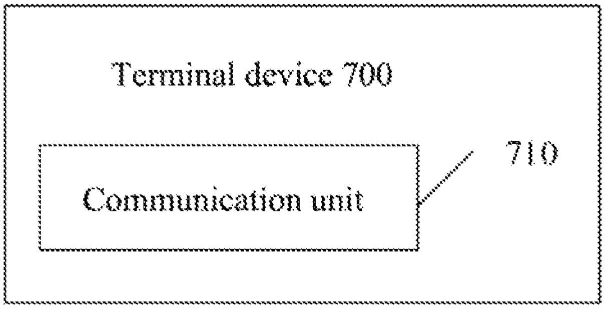
FIG. 7 is a schematic block diagram of a terminal device provided by an embodiment of the present disclosure.

FIG. 7 is a schematic block diagram of a terminal device according to an embodiment of the present disclosure. The terminal device 700 includes a communication unit 710.

Optionally, in the embodiment of the present disclosure, the communication unit 710 is configured to:

receive an energy-saving signal sent by a network device, where the energy-saving signal is configured to indicate first configuration information of a signal used for synchronization; and receive the signal used for synchronization based on the first configuration information.

Optionally, in the embodiment of the present disclosure, the energy-saving signal is further configured to indicate whether there exists a paging message for the terminal device; or the energy-saving signal is further configured to indicate whether the terminal device enters an active state from a dormant state.

Optionally, in the embodiment of the present disclosure, the communication unit 710 is further configured to:

when the energy-saving signal is further configured to indicate that there exists a paging message for the terminal device, the terminal device receives the signal used for synchronization based on the first configuration information; or when the energy-saving signal is further configured to indicate that the terminal device enters an active state from a dormant state, the terminal device receives the signal used for synchronization based on the first configuration information.

Optionally, in the embodiment of the present disclosure, the first configuration information includes at least one of the following signals used for synchronization:

time domain resource information, density information, subcarrier information, bandwidth information, a transmission period, time offset information and time position information.

Optionally, in the embodiment of the present disclosure, the time domain resource information of the signal used for synchronization is configured to indicate a plurality of symbol sets occupied by the signal used for synchronization in a single slot and/or a slot occupied by the signal used for synchronization.

Optionally, in the embodiment of the present disclosure, when the terminal device is used for communication below 6 GHZ, the plurality of symbol sets include at least two of the following symbol sets: $l \in \{4,8\}$, $l \in \{5,9\}$ and $l \in \{6,10\}$; or when the terminal device is used for communication above 6 GHZ, the plurality of symbol sets include at least two of the following symbol sets: $l \in \{4,8\}$, $l \in \{5,9\}$, $l \in \{6,10\}$, $l \in \{0,4\}$, $l \in \{1,5\}$, $l \in \{2,6\}$, $l \in \{3,7\}$, $l \in \{7,11\}$, $l \in \{8,12\}$ and $l \in \{9,13\}$.

Optionally, in the embodiment of the present disclosure, the energy-saving signal indicates the first configuration information through an included sequence and/or an occupied resource;

where different sequences and/or occupied resources indicate different configuration information of the signal used for synchronization.

Optionally, in the embodiment of the present disclosure, configuration information of the signal used for synchronization includes the first configuration information and second configuration information, and the second configuration information is configured to indicate all or part of configuration information not included in the first configuration information in the configuration information of the signal used for synchronization; and the communication unit 710 is further configured to:

receive higher layer signaling of the network device, where the higher layer signaling is configured to indicate the second configuration information; and receive the signal used for synchronization based on the first configuration information and the second configuration information.

Optionally, in the embodiment of the present disclosure, the signal used for synchronization is used for time-frequency synchronization for the terminal device in an idle state.

The terminal device 700 can implement the corresponding operations implemented by the terminal device in the method 200 which will not be repeated herein for brevity.

Optionally, in the embodiment of the present disclosure, the communication unit 710 is configured to:

receive indication information sent by a network device, where the indication information is configured to indicate a plurality of symbol sets occupied by a signal used for synchronization in a single slot; and receive the signal used for synchronization based on the indication information.

Optionally, in the embodiment of the present disclosure, each symbol set includes at least two symbols.

Optionally, in the embodiment of the present disclosure, when the terminal device is used for communication below 6 GHZ, the plurality of symbol sets include at least two of the following symbol sets: $l\in\{4,8\}$, $l\in\{5,9\}$ and $l\in\{6,10\}$; or when the terminal device is used for communication above 6 GHZ, the plurality of symbol sets include at least two of the following symbol sets: $l\in\{4,8\}$, $l\in\{5,9\}$, $l\in\{6,10\}$, $l\in\{0,4\}$, $l\in\{1,5\}$, $l\in\{2,6\}$, $l\in\{3,7\}$, $l\in\{7,11\}$, $l\in\{8,12\}$ and $l\in\{9,13\}$.

Optionally, in the embodiment of the present disclosure, the indication information is further configured to indicate the slot occupied by the signal used for synchronization.

Optionally, in the embodiment of the present disclosure, the indication information is carried in a broadcast message, radio resource control RRC signaling or an energy-saving signal.

Optionally, in the embodiment of the present disclosure, the energy-saving signal is configured to indicate whether there exists a paging message for the terminal device; or the energy-saving signal is configured to indicate whether the terminal device enters an active state from a dormant state.

Optionally, in the embodiment of the present disclosure, the signal used for synchronization is used for time-frequency synchronization for the terminal device in an idle state.

The terminal device 700 can implement the corresponding operations implemented by the terminal device in the method 300, which will not be repeated herein for brevity.

Optionally, in the embodiment of the present disclosure, the communication unit 710 is configured to:

receive a broadcast message sent by a network device, where the broadcast message is configured to indicate configuration information of a tracking reference signal TRS or an enhanced tracking reference signal eTRS; and receive the TRS or the eTRS based on the configuration information.

Optionally, in the embodiment of the present disclosure, the configuration information includes at least one of the following of the TRS or the eTRS:

time domain resource information, density information, subcarrier information, bandwidth information, a transmission period, time offset information and time position information.

Optionally, in the embodiment of the present disclosure, the time domain resource information of the TRS or the eTRS is configured to indicate a plurality of symbol sets occupied by the TRS or the eTRS in a single slot and/or a slot occupied by the TRS or the eTRS.

Optionally, in the embodiment of the present disclosure, when the terminal device is used for communication below 6 GHZ, the plurality of symbol sets include at least two of the following symbol sets: $l\in\{4,8\}$, $l\in\{5,9\}$ and $l\in\{6,10\}$; or when the terminal device is used for communication above 6 GHZ, the plurality of symbol sets include at least two of the following symbol sets: $l\in\{4,8\}$, $l\in\{5,9\}$, $l\in\{6,10\}$, $l\in\{0,4\}$, $l\in\{1,5\}$, $l\in\{2,6\}$, $l\in\{3,7\}$, $l\in\{7,11\}$, $l\in\{8,12\}$ and $l\in\{9,13\}$.

Optionally, in the embodiment of the present disclosure, the signal used for synchronization is used for time-frequency synchronization for the terminal device in an idle state.

The terminal device 700 can implement the corresponding operations implemented by the terminal device in the method 400, which will not be repeated herein for brevity.

Figure 8:
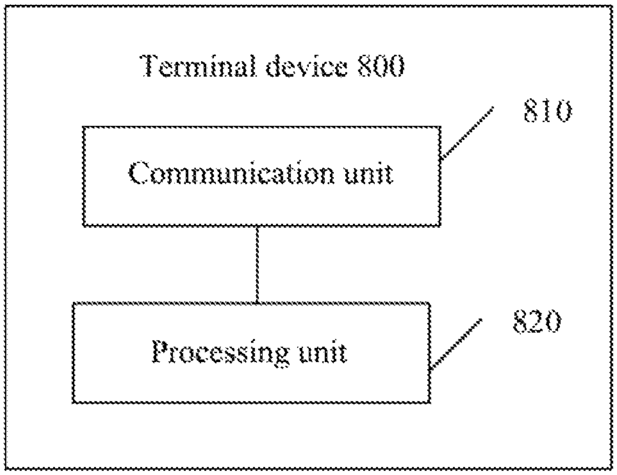
FIG. 8 is a schematic block diagram of a terminal device provided by an embodiment of the present disclosure.

FIG. 8 is a schematic block diagram of a terminal device 800 according to an embodiment of the present disclosure. The terminal device 800 includes a communication unit 810 and a processing unit 820. Where the communication unit 810 is configured to: receive a signal used for synchronization sent by a network device, where the signal used for synchronization occupies a plurality of symbol sets in a single slot; and the processing unit 820 is configured to: perform time-frequency synchronization based on the received signal used for synchronization.

Optionally, in the embodiment of the present disclosure, each symbol set includes at least two symbols.

Optionally, in the embodiment of the present disclosure, when the terminal device is used for communication below 6 GHz, the plurality of symbol sets include at least two of the following symbol sets: $l\in\{4,8\}$, $l\in\{5,9\}$ and $l\in\{6,10\}$; or when the terminal device is used for communication above 6 GHZ, the plurality of symbol sets include at least two of the following symbol sets: $l\in\{4,8\}$, $l\in\{5,9\}$, $l\in\{6,10\}$, $l\in\{0,4\}$, $l\in\{1,5\}$, $l\in\{2,6\}$, $l\in\{3,7\}$, $l\in\{7,11\}$, $l\in\{8,12\}$ and $l\in\{9,13\}$.

Optionally, in the embodiment of the present disclosure, the signal used for synchronization may occupy one or more slots.

Optionally, in the embodiment of the present disclosure, the communication unit 810 is further configured to:

receive indication information sent by the network device, where the indication information is configured to indicate configuration information of the signal used for synchronization; and receive the signal used for synchronization based on the indication information.

Optionally, in the embodiment of the present disclosure, the indication information is carried in an energy-saving signal, radio resource control RRC signaling or a broadcast message.

Optionally, in the embodiment of the preset application, the energy-saving signal is configured to indicate whether there exists a paging message for the terminal device; or the energy-saving signal is configured to indicate whether the terminal device enters an active state from a dormant state.

Optionally, in the embodiment of the present disclosure, the signal used for synchronization is used for time-frequency synchronization for the terminal device in an idle state.

The terminal device 800 can implement the corresponding operations implemented by the terminal device in the method 500, which will not be repeated herein for brevity.

Figure 9:
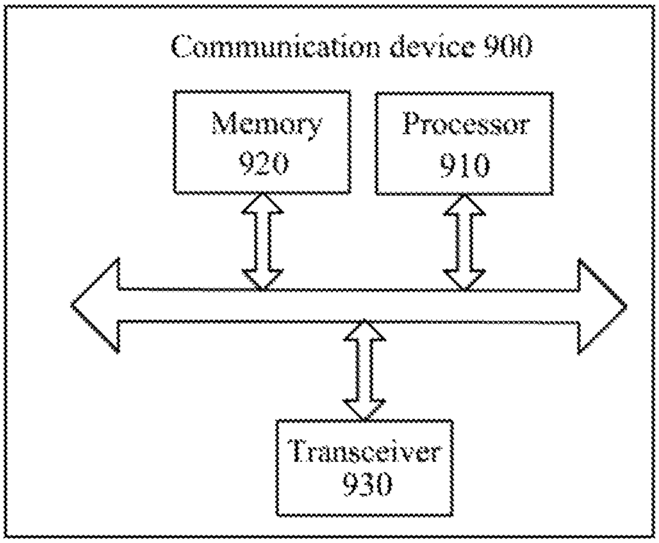
FIG. 9 is a schematic block diagram of a communication device provided by an embodiment of the present disclosure.

FIG. 9 is a schematic structural diagram of a communication device 900 provided by an embodiment of the present disclosure. The communication device 900 shown in FIG. 9 including: a processor 910 that can call and run a computer program from a memory to implement the method according to the embodiment of the present disclosure.

Optionally, as shown in FIG. 9, the communication device 900 may further include a memory 920. Where the processor 910 can call and run a computer program from the memory 920 to implement the method in the embodiment of the present disclosure.

Among them, the memory 920 may be a separate device independent of the processor 910 or integrated in the processor 910.

Optionally, as shown in FIG. 9, the communication device 900 may further include a transceiver 930, and the processor 910 may control the transceiver 930 to communicate with other devices, specifically, it may send information or data to other devices, or receive information or data sent by other devices.

Among them, the transceiver 930 may include a transmitter and a receiver. The transceiver 930 may further include antennas, and the number of antennas may be one or multiple.

Optionally, the communication device 900 may, specifically, be a network device according to an embodiment of the present disclosure, and the communication device 900 may implement the corresponding processes implemented by the network device in each method according to an embodiment of the present disclosure, which will not be repeated herein for brevity.

Optionally, the communication device 900 may, specifically, be a mobile terminal/terminal device according to an embodiment of the present disclosure, and the communication device 900 may implement the corresponding processes implemented by the mobile terminal/terminal device in each method according to an embodiment of the present disclosure, which will not be repeated herein for brevity.

Figure 10:
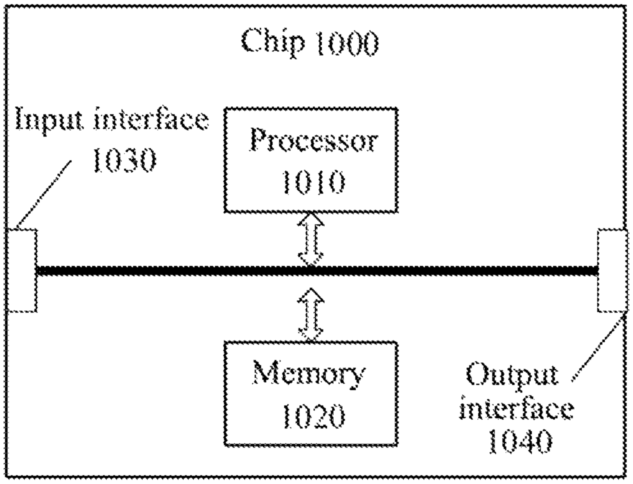
FIG. 10 is a schematic block diagram of a chip provided by an embodiment of the present disclosure.

FIG. 10 is a schematic structural diagram of a chip according to an embodiment of the present disclosure. The chip 1000 shown in FIG. 10 including: a processor 1010, and the processor 1010 can call and run a computer program from a memory to implement the method according to the embodiment of the present disclosure.

Optionally, as shown in FIG. 10, the chip 1000 may further include a memory 1020. Where, the processor 1010 can call and run a computer program from the memory 1020 to implement the method according to the embodiment of the present disclosure.

Among them, the memory 1020 may be a separate device independent of the processor 1010 or integrated in the processor 1010.

Optionally, the chip 1000 may further include an input interface 1030. Where the processor 1010 can control the input interface 1030 to communicate with other devices or chips, and specifically, can obtain information or data sent by other devices or chips.

Optionally, the chip 1000 may further include an output interface 1040. The processor 1010 can control the output interface 1040 to communicate with other devices or chips, and specifically, to output information or data to other devices or chips.

Optionally, the chip can be applied to the network device according to the embodiment of the present disclosure, and the chip can implement the corresponding processes implemented by the network device in each method according to the embodiment of the present disclosure, which will not be repeated herein for brevity.

Optionally, the chip can be applied to the mobile terminal/terminal device according to the embodiment of the present disclosure, and the chip can implement the corresponding processes implemented by the mobile terminal/terminal device in each method according to the embodiment of the present disclosure, which will not be repeated herein for brevity.

It should be understood that the chips mentioned in the embodiment of the present disclosure may also be referred to as the system-level chip, system chip, chip system, system-on-chip chip or the like.

Figure 11:
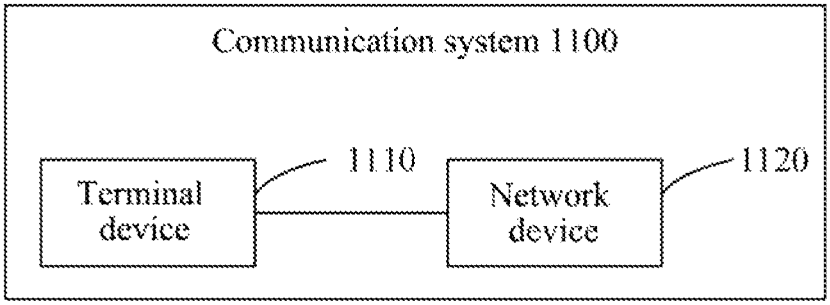
FIG. 11 is a schematic block diagram of a communication system provided by an embodiment of the present disclosure.

FIG. 11 is a schematic block diagram of a communication system 1100 provided by an embodiment of the present disclosure. As shown in FIG. 11, the communication system 1100 including: a terminal device 1110 and a network device 1120.

Among them, the terminal device 1110 can be used to implement corresponding functions implemented by the terminal device in the above methods, and the network device 1120 can be used to implement corresponding functions implemented by the network device in the above methods, which will not be repeated herein for brevity.

It should be understood that the processor in the embodiment of the present disclosure may be an integrated circuit chip with signal processing capability. In the implementation process, each step of the above method embodiment may be completed by an integrated logic circuit of hardware in the processor or instructions in the form of software. The above processor may be a general-purpose processor, a digital signal processor (DSP), an application specific integrated circuit (ASIC), a field programmable gate array (FPGA) or other programmable logic devices, discrete gates or transistor logic devices, or discrete hardware components. The disclosed methods, steps and logical block diagrams in the embodiment of the present disclosure may be implemented or executed. The general-purpose processor may be a microprocessor or the processor may be any conventional processor or the like. The steps of the method disclosed in connection with the embodiment of the present disclosure can be directly embodied as being executed by a hardware decoding processor or being executed by a combination of hardware and software modules in the decoding processor. The software module may be located in a storage medium that is mature in the field such as random access memory, flash memory, read-only memory, programmable read-only memory or electrically erasable programmable memory, registers. The storage medium is located in the memory, and the processor reads the information in the memory and completes the steps of the above method in combination with its hardware.

It should be understood that the memory in the embodiment of the present disclosure may be a volatile memory or a nonvolatile memory, or may include both the volatile and the nonvolatile memory. The nonvolatile memory may be a read-only memory (ROM), a programmable ROM (PROM), an erasable PROM (EPROM), an electrically erasable EPROM (EEPROM), or a flash memory. The volatile memory may be a random access memory (RAM), which serves as an external cache. By way of example but not limitation, many forms of RAM are available, such as a static RAM (SRAM), a dynamic RAM (DRAM), a synchronous DRAM (SDRAM), a double data rate SDRAM (DDR SDRAM), enhanced SDRAM (ESDRAM), synchlink DRAM (SLDRAM) and direct rambus RAM (DR RAM). It should be noted that the memories of the systems and methods described herein are intended to include, but are not limited to, these and any other suitable types of memories.

It should be understood that the foregoing memory is an exemplary description instead of a limiting one. For example, the memory in the embodiment of the present disclosure can also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM), etc. That is, the memory in the embodiment of the present disclosure is intended to include, but is not limited to, these and any other suitable types of memories.

The embodiment of the present disclosure also provides a computer-readable storage medium for storing a computer program.

Optionally, the computer-readable storage medium can be applied to the network device in the embodiment of the present disclosure, and the computer program enables the computer to execute the corresponding flows implemented by the network device in each method according to the embodiment of the present disclosure, which will not be repeated herein for brevity.

Optionally, the computer-readable storage medium can be applied to the mobile terminal/terminal device in the embodiment of the present disclosure, and the computer program enables the computer to execute the corresponding flows implemented by the mobile terminal/terminal device in each method according to the embodiment of the present disclosure, which will not be repeated herein for brevity.

The embodiment of the present disclosure also provides a computer program product, including computer program instructions.

Optionally, the computer program product can be applied to the network device according to the embodiment of the present disclosure, and the computer program instruction enables the computer to execute the corresponding flows implemented by the network device in each method according to the embodiment of the present disclosure, which will not be repeated herein for brevity.

Optionally, the computer program product can be applied to the mobile terminal/terminal device according to the embodiment of the present disclosure, and the computer program instruction enables the computer to execute the corresponding flows implemented by the mobile terminal/terminal device in each method according to the embodiment of the present disclosure, which will not be repeated herein for brevity.

The embodiment of the present disclosure also provides a computer program.

Optionally, the computer program can be applied to the network device according to the embodiment of the present disclosure, and when the computer program runs on a computer, it enables the computer to execute the corresponding flows implemented by the network device in each method according to the embodiment of the present disclosure, which will not be repeated herein for brevity.

Optionally, the computer program can be applied to the mobile terminal/terminal device according to the embodiment of the present disclosure, and when the computer program runs on a computer, it enables the computer to execute the corresponding flows implemented by the mobile terminal/terminal device in each method according to the embodiment of the present disclosure, which will not be repeated herein for brevity.

Persons of ordinary skill in the art will recognize that a combination of the units and algorithm steps of the examples described in the embodiments disclosed herein can be implemented in electronic hardware, or a combination of computer software and electronic hardware. Whether these functions are implemented in hardware or software depends on the specific application and design constraints of the technical solution. Professional technicians may use different methods to implement the described functions for each specific application, but such implementation should not be considered beyond the scope of this application.

Those skilled in the art can clearly understand that for convenience and conciseness of description, the specific working processes of the above-described systems, devices and units may refer to the corresponding processes in the above-described method embodiments and will not be repeated herein.

In several embodiments provided in the present disclosure, it should be understood that the disclosed systems, devices and methods may be implemented in other ways. For example, the device embodiments described above are only illustrative. For example, the division of the units is only a logic function division. In actual implementation, there may be other division methods, for example, a plurality of units or components may be combined or integrated into another system, or some features may be ignored or not implemented. On the other hand, the mutual coupling or direct coupling or communication connection shown or discussed may be indirect coupling or communication connection through some interfaces, devices or units, and may be in electrical, mechanical or other forms.

The units described as separate components may or may not be physically separate, the components displayed as units may be or may not be physical units, i.e., may be located in one place or may be distributed over a plurality of network units. Some or all of the units can be selected as required to achieve the purpose of the solution of the present embodiment.

In addition, each functional unit in each embodiment of the present disclosure may be integrated into one processing unit, each unit may exist physically separately, or two or more units may be integrated into one unit.

If the functions are implemented in the form of software functional units and sold or used as independent products, they can be stored in a computer readable storage medium. Based on this understanding, in essence, the technical solution of the present disclosure or the part that contributes to the prior art or the part of the technical solution can be embodied in the form of a software product, which is stored in a storage medium and includes several instructions to cause a computer device (which can be a personal computer, a server, or a network device, etc.) to perform all or part of the steps of the method according to various embodiments of the present disclosure. The above storage media include: U disk, removable hard disk, read-only memory (ROM), random access memory (RAM), magnetic disk or optical disk and other media that can store program codes.

The above is only a specific implementation of the present disclosure, but the scope of protection of the present disclosure is not limited thereto. Any person familiar with the technical field can easily think of changes or substitutions within the technical scope disclosed in the present disclosure, and should be covered within the scope of protection of the present disclosure. Therefore, the scope of protection of the present disclosure shall be subject to the scope of protection of the claims.

What is claimed is:

1. A wireless communication method, comprising:

sending, by a network device, an energy-saving signal to a terminal device, wherein the energy-saving signal is configured to indicate first configuration information of a tracking reference signal;

wherein the energy-saving signal is further configured to indicate whether there exists a paging message for the terminal device;

wherein configuration information of the tracking reference signal comprises the first configuration information and second configuration information, wherein the second configuration information is configured to indicate all or part of configuration information not comprised in the first configuration information in the configuration information of the tracking reference signal; and the method further comprises:

sending, by the network device, higher layer signaling to the terminal device, wherein the higher layer signaling is configured to indicate the second configuration information.

2. The method of claim 1, wherein when the energy-saving signal is further configured to indicate that there exists the paging message for the terminal device, the energy-saving signal is configured to indicate the first configuration information.

3. A wireless communication method, comprising:

receiving, by a terminal device, an energy-saving signal sent by a network device, wherein the energy-saving signal is configured to indicate first configuration information of a tracking reference signal; and receiving, by the terminal device, the tracking reference signal based on the first configuration information;

wherein the energy-saving signal is further configured to indicate whether there exists a paging message for the terminal device;

wherein configuration information of the tracking reference signal comprises the first configuration information and second configuration information and the second configuration information is configured to indicate all or part of configuration information not comprised in the first configuration information in the configuration information of the tracking reference signal; and the method further comprises:

receiving, by the terminal device, higher layer signaling of the network device, wherein the higher layer signaling is configured to indicate the second configuration information;

wherein the receiving, by the terminal device, the tracking reference signal based on the first configuration information comprises:

receiving, by the terminal device the tracking reference signal based on the first configuration information and the second configuration information.

4. The method of claim 3, wherein the receiving, by the terminal device, the tracking reference signal based on the first configuration information comprises:

when the energy-saving signal is further configured to indicate that there exists the paging message for the terminal device, receiving, by the terminal device, the tracking reference signal based on the first configuration information.

5. A network device, comprising:

a memory, a processor, an input interface and an output interface, wherein the memory, the processor, the input interface and the output interface are interconnected via a bus system, the memory is configured to store instructions, the processor is configured to:

send an energy-saving signal to the terminal device, wherein the energy-saving signal is configured to indicate first configuration information of a tracking reference signal;

wherein the energy-saving signal is further configured to indicate whether there exists a paging message for the terminal device;

wherein configuration information of the tracking reference signal comprises the first configuration information and second configuration information, wherein the second configuration information is configured to indicate all or part of configuration information not comprised in the first configuration information in the configuration information of the tracking reference signal; and the processor is further configured to;

send higher layer signaling to the terminal device, wherein the higher layer signaling is configured to indicate the second configuration information.

6. The network device of claim 5, wherein when the energy-saving signal is further configured to indicate that there exists the paging message for the terminal device, the energy-saving signal is configured to indicate the first configuration information.

7. The network device of claim 5, wherein the first configuration information comprises at least one of the following of the tracking reference signal:

time domain resource information, density information, subcarrier information, bandwidth information, a transmission period, time offset information and time position information.

8. The network device of claim 7, wherein the time domain resource information of the tracking reference signal is configured to indicate a plurality of symbol sets occupied by the tracking reference signal in a single slot and/or a slot occupied by the tracking reference signal.

9. The network device of claim 8, wherein when the wireless communication method is used for communication below 6 GHZ, the plurality of symbol sets comprise at least two of the following symbol sets: $l \in \{4,8\}$, $l \in \{5,9\}$ and $l \in \{6,10\}$; or when the wireless communication method is used for communication above 6 GHZ, the plurality of symbol sets comprise at least two of the following symbol sets: l∈{4,8}, l∈{5,9}, l∈{6,10}, l∈{0,4}, l∈{1,5}, l∈{2,6}, l∈{3,7}, l∈{7,11}, l∈{8,12} and l∈{9,13}.

10. The network device of claim 5, wherein the energy-saving signal indicates the first configuration information through a comprised sequence and/or an occupied resource;

wherein different sequences and/or occupied resources indicate different configuration information of the tracking reference signal.

11. The network device of claim 5, wherein the tracking reference signal is used for time-frequency synchronization for the terminal device in an idle state.

12. A terminal device, comprising:

a memory, a processor, an input interface and an output interface, wherein the memory, the processor, the input interface and the output interface are interconnected via a bus system, the memory is configured to store instructions, the processor is configured to:

receive an energy-saving signal sent by a network device, wherein the energy-saving signal is configured to indicate first configuration information of a tracking reference signal; and receive the tracking reference signal based on the first configuration information;

wherein the energy-saving signal is further configured to indicate whether there exists a paging message for the terminal device;

wherein configuration information of the tracking reference signal comprises the first configuration information and second configuration information, and the second configuration information is configured to indicate all or part of configuration information not comprised in the first configuration information in the configuration information of the tracking reference signal; and the processor is further configured to:

receive higher layer signaling of the network device, wherein the higher layer signaling is configured to indicate the second configuration information; and receive the tracking reference signal based on the first configuration information and the second configuration information.

13. The terminal device of claim 12, wherein the processor is further configured to:

when the energy-saving signal is further configured to indicate that there exists the paging message for the terminal device, receive the tracking reference signal based on the first configuration information.

14. The terminal device of claim 12, wherein the first configuration information comprises at least one of the following of the tracking reference signal:

time domain resource information, density information, subcarrier information, bandwidth information, a transmission period, time offset information and time position information.

15. The terminal device of claim 14, wherein the time domain resource information of the tracking reference signal is configured to indicate a plurality of symbol sets occupied by the tracking reference signal in a single slot and/or a slot occupied by the tracking reference signal.

16. The terminal device of claim 15, wherein when the terminal device is used for communication below 6 GHZ, the plurality of symbol sets comprise at least two of the following symbol sets: l∈{4,8}, l∈{5,9} and l∈{6,10}; of when the terminal device is used for communication above 6 GHZ, the plurality of symbol sets comprise at least two of the following symbol sets: l∈{4,8}, l∈{5,9}, l∈{6,10}, l∈{0,4}, l∈{1,5}, l∈{2,6}, l∈{3,7}, l∈{7,11}, l∈{8,12} and l∈{9,13}.

17. The terminal device of claim 12, wherein the energy-saving signal indicates the first configuration information through a comprised sequence and/or an occupied resource; wherein different sequences and/or occupied resources indicate different configuration information of the tracking reference signal.

18. The terminal device of claim 12, wherein the tracking reference signal is used for time-frequency synchronization for the terminal device in an idle state.

* * * * *